Figure 1:
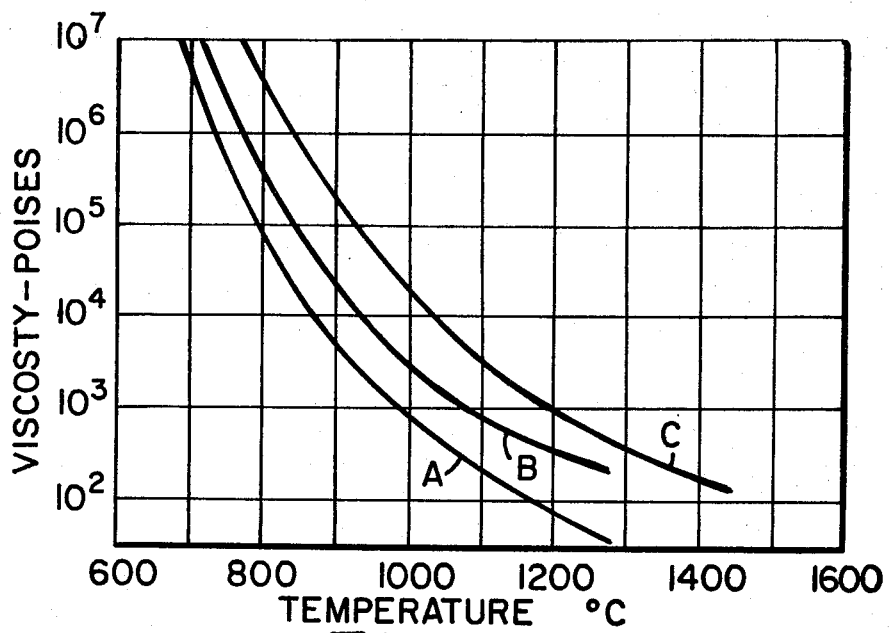

United States Patent [19]
Morgan

[11] 3,773,530
[45] Nov. 20, 1973

[54] GLASSES CONTAINING CADMIUM SULFIDE AS A COLORANT

[75] Inventor: David W. Morgan, Corning, N.Y.
[73] Assignee: Corning Glass Works, Corning, N.Y.
[22] Filed: Nov. 8, 1971
[21] Appl. No.: 196,659

[52] U.S. Cl. .................................. 106/54
[51] Int. Cl. ......... C03c 3/08, C03c 3/20, C03c 3/04
[58] Field of Search ..................................... 106/54

[56] References Cited
UNITED STATES PATENTS

| | | | |
|---|---|---|---|
| 2,229,416 | 8/1938 | Lyle | 106/54 |
| 2,382,282 | 11/1942 | Austin et al. | 106/54 |
| 3,527,649 | 9/1970 | Sullivan | 106/54 |

FOREIGN PATENTS OR APPLICATIONS

| | | | |
|---|---|---|---|
| 1,490,974 | 8/1967 | France | 106/54 |
| 4,319,402 | 8/1968 | Japan | 106/54 |
| 143,521 | 1/1961 | U.S.S.R. | 106/54 |

*Primary Examiner*—A. B. Curtis
*Assistant Examiner*—Mark Bell
*Attorney*—Clarence R. Patty, Jr. et al.

[57] ABSTRACT

Glasses which contain cadmium sulfide (CdS) as a colorant, and which are compatible with platinum while the glass is in the molten state, are melted under non-reducing conditions at a temperature not in excess of 1300°C. Suitable base glasses have a viscosity not over 200 poises at 1300°C. and contain, in percent by weight on an oxide basis, 40–60% $SiO_2$, 5–20% $B_2O_3$, 1.5–6.0% $Al_2O_3$, 4–8% $Na_2O$, 6–14% $K_2O$, 4–12% ZnO, 0–6% BaO, 0–8% $P_2O_5$. In addition, the glass contains cadmium, calculated as the oxide (CdO), sulfur and, if desired, selenium, as colorants.

3 Claims, 4 Drawing Figures

Patented Nov. 20, 1973   3,773,530

2 Sheets-Sheet 1

INVENTOR.
David W. Morgan
BY
ATTORNEY

GLASSES CONTAINING CADMIUM SULFIDE AS A COLORANT

The invention relates to the production of glasses which contain cadmium sulfide (CdS) as a colorant, and which may optionally contain selenium in conjunction therewith. It is particularly concerned with a melting process for such glasses wherein the molten glass is maintained compatible with platinum.

An early reference to the use of cadmium sulfide and selenium as glass colorants appears in U.S. Pat. No. 479,689 granted to Franz Welz on July 26, 1892. A subsequent patent, U.S. Pat. No. 1,536,920 granted May 5, 1925 to J. C. Parkinson, relates to the use of cadmium sulfide alone as a colorant in glass.

The Welz patent explains that the glass color varies from red through orange to yellow as the proportion of cadmium sulfide to selenium is increased. This relationship of colorant proportions to color was subsequently investigated in greater detail by Rooksby in 1932 using X-ray crystallographic methods, Journal of the Society of Glass Technology, 16, pp. 171–181 (1932).

Glasses containing cadmium sulfide, with or without selenium, frequently are colorless as melted. It is then necessary to develop color in the glass by a heat treatment which may consist of cooling the glass slowly, holding the glass at an intermediate temperature, or reheating the glass after it has been formed. If the color development time is too long, or if other unfavorable factors prevail, there is a tendency for crystals to grow to the size of the wavelengths of light. In that case, the glass becomes hazy or opalescent, and the color is said to be waxy. This condition is particularly undesirable in such optical glassware as light filters and lenses.

U.S. Pat. No. 1,864,858, granted to W. H. Rising on June 28, 1932, discloses the desirability of incorporating zinc in a cadmium sulfide glass to produce a sharp color cutoff, particularly in borosilicate base glasses. This patent further notes that the presence of zinc may aggravate the problem of opalescence. To counter this, it is recommended to add cadmium oxide (CdO) to the glass batch. The patent suggests that an equilibrium exists between the oxides and sulfides of zinc and cadmium, and that the presence of excess CdO tends to move the equilibrium away from zinc sulfide (ZnS).

Subsequent United States patents granted to Austin et al., U.S. Pat. No. 2,309,070 and U.S. Pat. No. 2,382,282, describe the production of a ruby color by the addition of cadmium sulfide and selenium to a soda lime base glass containing less than 1% ZnO. The glass is eld at an intermediate temperature below its melting temperature to develop the color. The addition of 1–4% $Al_2O_3$ is described as aiding in color development and shortening the hold time at the intermediate temperature. These patents describe the common practice of melting such glasses in a reducing atmosphere. Thus, they recommend a combustion atmosphere containing 2% to 5% of CO, no free oxygen, and a melting temperature in the range of 2600° to 2700°F. (1425°–1475°C.).

U.S. Pat. No. 2,561,325, granted July 24, 1951 to Duncan, discloses that a soda lime type glass containing cadmium sulfide within a critical range of 0.2–0.6% is a colorless glass that transmits ultraviolet light.

In melting glasses containing cadmium sulfide, it is customary to employ reducing conditions such as recommended in the Austin et al. patents referred to above. Such conditions generally minimize loss of sulfur during the melting process, and thereby facilitate the development and control of color in the glass. The desired reducing conditions may be achieved by providing a reducing atmosphere above the melt, by addition of reducing agents to the batch, or by a combination of these. The atmosphere above the glass melt may be rendered reducing by adjusting the fuel burners on a gas or oil fired melting unit to provide a flame containing reduced forms of carbon as suggested by Austin et al. Alternatively, a reducing gas may be fed directly into the furnace atmosphere. It is also well-known glassmaking practice to add reducing materials, such as carbonaceous materials, elemental metals, silicides and certain oxides, to a glass batch.

The practice of melting cadmium sulfide glasses under reducing conditions has been found to have one particularly undesirable feature. It essentially forecloses the use of platinum in melting units for such glasses, or in equipment for handling the molten glass. The reducing conditions tend to produce free or elemental cadmium and/or zinc in the melt. These metals alloy with the platinum, thereby quickly destroying its refractory character, and hence its usefulness as a refractory surface.

Nevertheless, the products produced from cadmium sulfide glasses are frequently small volume items which require a high optical quality, that is freedom from cords, refractory particles and other foreign matter. It would, therefore, be particularly desirable to use available melting and conditioning equipment embodying glass contacting surfaces composed of platinum in order to insure production of optical quality products.

For example, in melting optical glass, it is customary to use a small continuous melting unit such as disclosed in U.S. Pat. No. 2,490,339 granted Dec. 6, 1949 to C. F. DeVoe. With reference to the patent, such a unit has a chamber 12 into which the glass passes for conditioning, and which may be constructed of, or lined with platinum. Characteristically, the molten glass is heated to a somewhat higher temperature in this chamber, and then cooled to a working temperature in working chamber 16. It is also customary to line chamber 16 with platinum and to use a platinum delivery system in removing glass for working.

Optical glass production units may also be provided with a homogenizing system. This may either be incorporated in the working chamber, or be joined thereto. The components in such system are commonly platinum clad as described in U.S. Pat. No. 3,157,482, granted Nov. 17, 1964 to A. P. Nero and J. W. Ryan.

It is a primary purpose of the present invention to provide an improved method of producing a glass containing cadmium sulfide as a colorant. A particular feature of the invention is the provision of a method wherein such a glass is maintained compatible with platinum so that the two may be brought in contact with each other without destructive alloying of the latter. Another purpose is to provide a method of melting such a glass wherein loss of both cadmium and sulfur during the melting process is minimized. A further purpose is to provide a family of glass compositions that is particularly useful in carrying out the method of the invention.

The invention is based in part on my discovery that the normal requirement of reducing conditions for melting a cadmium sulfide containing glass may be dispensed with providing the batch is melted at a temperature not exceeding about 1300°C. and the glass is maintained at or below that temperature after melting. It is further based on my discovery of a small family of glass compositions which will melt satisfactorily under these conditions, and which will also provide the characteristics necessary for development of a clear yellow color when cadmium sulfide is added to the glass. In particular, a sharp color cutoff around 5000 Angstrom units in the yellow portion of the visible spectrum may be obtained by the addition of cadmium sulfide as a colorant to these glasses.

Based on these and other discoveries, my invention is a method of producing a glass containing cadmium sulfide as a colorant, wherein the glass is compatible with platinum while the glass is in the molten state, comprising the steps of adding the colorant constituents to a batch for a base glass having a viscosity not exceeding about 200 poises at 1300°C., melting the batch under non-reducing conditions and at a temperature not exceeding about 1300°C., and maintaining the molten glass at or below this temperature thereafter.

It is my belief that problems previously encountered in melting glasses containing cadmium sulfide resulted from a tendency of the sulfur to separate from the glass as an oxide, thus leaving cadmium and/or zinc without a stabilizing anion and hence capable of readily alloying with platinum at the relatively high melting temperature involved. In order to counter these tendencies, it was considered necessary to introduce additional cadmium and/or employ reducing conditions. It now appears that this tendency is effectively reversed by maintaining the temperature of the glass at or below 1300°C. during the melting process and subsequent thereto. At such lower temperatures, the cadmium sulfide apparently remains in solution in the glass. Consequently, there is little tendency to dissociate into sulfur, which oxidizes to $SO_3$, and free or elemental cadmium, which tends to alloy with any platinum available.

Except as otherwise indicated, conventional melting practices may be followed in carrying out the method of the invention. Thus, a suitably proportioned glass batch may be formulated and mixed on the basis of conventional glassmaking materials. These include, for example, sand, boric acid or borax, sodium and potassium carbonates, hydrated alumina and/or aluminum metaphosphate, titania, and oxides of barium, zinc, and cadmium. Alternatively, nitrates, sulfates, carbonates, and other known glassmaking compounds may be employed in accordance with known practice. Cadmium is an essential additive for coloring purposes, and may be added as either the sulfide or the oxide. As taught by Rising, the presence of zinc is desirable to facilitate retention of sulfur in the melt. It has also been found desirable to add at least a portion of the sulfur as barium sulfide, and the glass preferably contains at least 2% barium computed as the oxide.

Any common type of glass melting unit may be employed. However, the method is particularly adapted to use with an optical melting unit such as described in the DeVoe patent. In particular, the glass may be melted in a ceramic refractory lined unit, and then conveyed to a conditioning or fining chamber which may be constructed of, or lined with, platinum. Thereafter the molten glass may be delivered through a platinum delivery system for working, or may first be treated with platinum lined equipment such as a stirrer. If desired, the glass may be premelted to form an all-cullet batch for continuous melting and product formation. The cullet batch may also be brought to the molten state in a ceramic melting chamber with the melt then being conditioned in, and delivered for working from, chambers lined with platinum.

During the melting and further treatment, a non-reducing atmosphere is maintained above the glass. This may be an inert atmosphere, for example nitrogen or argon. However, in the interest of economy it is generally desirable to use an ambient (air) or other mildly oxidizing atmosphere. A primary advantage of the present invention is the ability to use such an atmosphere and to retain the ingredients in the glass composition so that platinum-lined equipment may be employed.

A further feature of the invention is the temperature profile of the glass melt during the melting process. The peak temperature should occur as the batch melts. Thereafter, it is desirable that the temperature of the glass melt be reduced to working temperature either by continuous lowering of the temperature or by holding the temperature constant over part of the process. It is undesirable to raise the temperature of the melt during any part of the process subsequent to actual melting of the batch because this may produce dissociation of zinc and/or cadmium compounds. In any event, the temperature should not be raised above the melting temperature which, in turn, should not exceed 1300°C.

It is well known that the viscosity of a glass, as measured in poises, diminishes as the temperature increases. Accordingly, it has become customary in the glass art to define glass melting characteristics in terms of the glass viscosity, as well as the glass temperature. Melting characteristics, as well as various glass characteristics, then, are illustrated or defined by means of a viscosity-temperature curve. As indicated earlier, the glass melting temperature for present purposes should not exceed 1300°C. In general, this means that the viscosity of a suitable glass should not exceed about 200 poises at a temperature of 1300°C., and is preferably lower at this temperature.

The commonly available glasses, such as soda lime, barium flint, and borosilicate glasses, do not melt at such low temperatures. Consideration must also be given to the requirement of a sharp color or transmission cutoff in the yellow portion of the spectrum for cadmium sulfide glasses and in the red portion of the spectrum for glasses additionally containing selenium. Lead glasses have traditionally been used as soft, low melting glasses, but tend to be unsuitable as base glasses for the present type of colored glasses because of both undesirable color and solution effects.

A further embodiment of the present invention then is the provision of a family of glasses which are capable of having sharp color cutoffs produced by the addition of cadmium sulfide alone, or in conjunction with selenium, and which additionally are capable of being melted at temperatures not exceeding 1300°C. These glasses consist essentially of, in weight percent on the oxide basis, 40–60% $SiO_2$, 5–20% $B_2O_3$, 0–8% $P_2O_5$, 1.5–6.0% $Al_2O_3$, 4–8% $Na_2O$, 6–14% $K_2O$, 4–12% ZnO, 0–6% BaO, 0.2–2.0% CdO and 0.2–1.0% S. In addition, the glasses may contain minor amounts of titania, CaO, and fluorine. Further, they may contain up to 1 percent selenium where an orange or ruby color is desired and may contain similar amounts of other colorants such as the oxides of copper, nickel, and cobalt where combination color effects are desired. Finally, it is desirable to avoid easily reducible oxides, such as lead oxide, and the normal fining agents antimony and arsenic oxides. Accordingly, it is desirable to employ a halide, such as sodium iodide, when a fining agent is required.

While glasses having compositions formulated within the above ranges are generally satisfactory, the invention is further described with respect to specific examples selected from this family of glasses.

Figure 2:
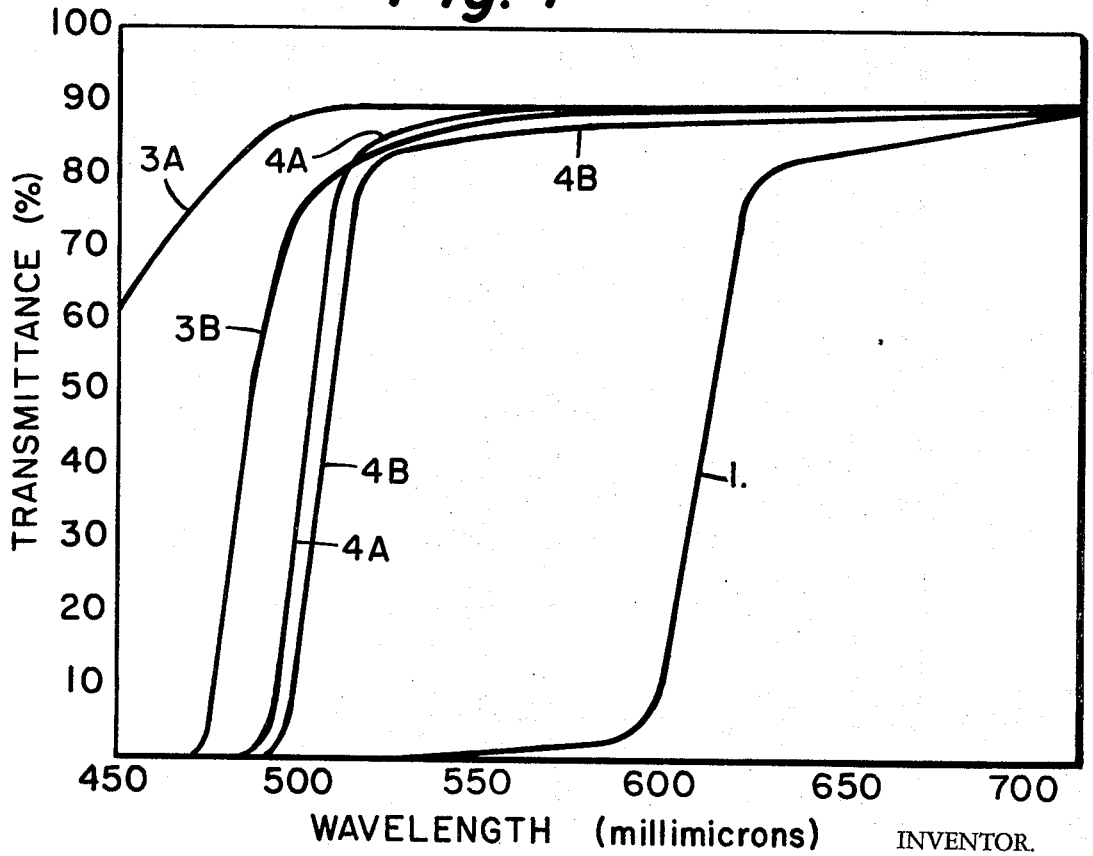
Figure 3:
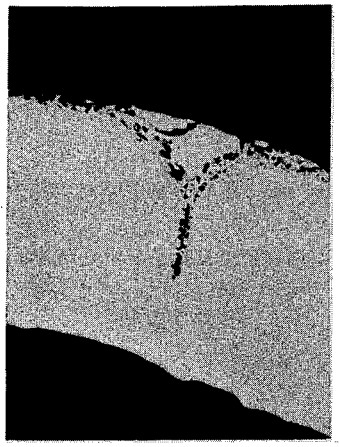
Figure 4:
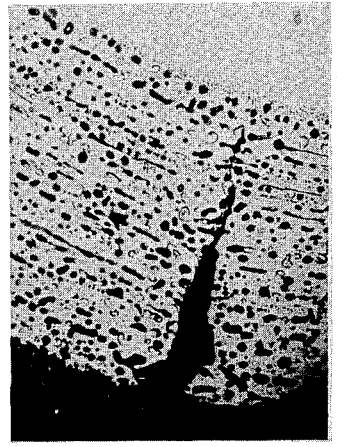

Specific features and/or properties of the invention are illustrated in the accompanying drawings wherein, FIG. 1 is a graphical illustration of temperature-viscosity relationships for three different glasses, FIG. 2 is a graphical illustration of visual light or color transmission characteristics for three (3) different glasses within the scope of the invention, and FIGS. 3 and 4 are photographs of cross sections of platinum cladding taken at a magnification of 66X and 100X, respectively.

In the examples that follow, batch compositions are given in parts by weight of the raw materials used. The oxide compositions are calculated from these batches in known manner in percent by weight on an oxide basis. The metal or cation constituents are each calculated on an oxide basis with their sum totaling 100 percent. The anions other than oxygen (sulfur, selenium, and halogens) are shown in percent by weight in excess of 100 percent. This expedient is adopted to avoid assigning these anions to specific cations inasmuch as the precise location is not known and may vary.

EXAMPLE 1

A batch for a red bead glass was formulated, the batch and the corresponding oxide composition by weight, as calculated from the batch, being:

| Batch | | Oxide | |
|---|---|---|---|
| Sand | 180.5 | $SiO_2$ | 45.6 |
| $H_3BO_3$ | 113.0 | $B_2O_3$ | 15.9 |
| $Al(OH)_3$ | 23.7 | $Al_2O_3$ | 3.9 |
| $BaCO_3$ | 20.4 | $Na_2O$ | 6.8 |
| $Na_2CO_3$ | 39.6 | $K_2O$ | 10.3 |
| $Na_2SiF_6$ | 6.6 | ZnO | 9.3 |
| $K_2CO_3$ | 60.9 | BaO | 5.8 |
| ZnO | 37.2 | CaO | 0.4 |
| $TiO_2$ | 3.1 | $TiO_2$ | 0.8 |
| CdO | 4.9 | CdO | 1.2 |
| BaS | 8.5 | S | 0.4 |
| $CaF_2$ | 1.5 | Se | 0.4 |
| NaI | 2.9 | F | 1.0 |

The batch was thoroughly mixed and fed into a small, gas-fired melting unit composed of ceramic refractory brick and having a tubular platinum orifice and delivery system extending through the bottom of the furnace to a height of about one foot about the furnace floor. The melting unit was operated at a temperature of about 1300°C., the batch melted for 6–8 hours and the glass thus produced was delivered through the platinum delivery system to a bead forming apparatus.

The temperature-viscosity curve for the resulting glass is shown as Curve A in FIG. 1 of the accompanying drawing. It will be observed that the glass has a viscosity of 200 poises at about 1100°C. This indicates the glass could be melted at this temperature. However, it was melted at a substantially higher temperature to provide a more fluid melt for bead formation.

Following a three-day run, the platinum delivery system was inspected and no sign of destructive alloying, or other damage from reduced metal, was observed.

EXAMPLE 2

This example describes the melting of a cadmium sulfide glass in contact with platinum in accordance with melting practices prior to the present invention.

A batch composed of conventional materials was formulated to provide a glass having the following composition as calculated in percent by weight on an oxide basis: 67.8% $SiO_2$, 11.9% $B_2O_3$, 0.9% $Al_2O_3$, 5.6% $Na_2O$, 11.9% ZnO, 0.8% CdO, 0.4% Se, 0.2% S and 1.1% $Sb_2O_3$. The batch was first melted in a ceramic refractory pot to produce cullet for an all-cullet melt in the melting unit described in Example 1. The practice of melting an all-cullet batch minimizes chemical reactions and changes in the melt, thus minimizing corrosive effects of the glass on the melting unit.

The cullet produced in the pot melt was crushed and introduced into the day tank of Example 1 at 1400°C. The antimony content provided a mild reducing action at this temperature. After a couple days, the run was discontinued and the furnace dismantled for repair. The platinum delivery system varied in appearance from a pock-marked, porous surface to a badly corroded, and broken or perforated, condition in spite of the fact that an all-cullet batch was used.

The accompanying drawing shows, by way of illustration, two pictures in cross section illustrating the typical appearance of alloyed and corroded platinum. These samples were removed from a glass working implement, but are typical of the appearance of the corroded platinum in the delivery system as dismantled.

FIG. 3 shows a mild condition in which the platinum remains intact, but has undergone surface corrosion. Note the penetration along a grain boundary. Presumably the corrosion is due to metal alloying with the platinum to provide soft spots which are corroded or washed away by glass flow.

FIG. 4 shows an advanced stage of destruction in which the alloying has penetrated completely through the platinum, again presumably along a grain boundary, and resulted in disintegration of the cladding.

The present invention is designed to avoid or minimize such platinum destruction during melting and treatment of cadmium sulfide glasses.

EXAMPLE 3

A batch for a filter glass having a sharp yellow cutoff was formulated on the basis of the following batch and corresponding oxide composition by weight as calculated from the batch:

| Batch | | Oxide | |
|---|---|---|---|
| Sand | 655.7 | $SiO_2$ | 50.4 |
| $H_3BO_3$ | 236.0 | $B_2O_3$ | 10.2 |
| $Al(OH)_3$ | 64.4 | $P_2O_5$ | 2.0 |
| $Al(PO_3)_3$ | 32.1 | $Al_2O_3$ | 3.7 |
| $BaCO_3$ | 85.1 | $Na_2O$ | 6.8 |
| $Na_2CO_3$ | 143.6 | $K_2O$ | 10.4 |
| $K_2CO_3$ | 199.1 | ZnO | 9.0 |
| ZnO | 116.7 | BaO | 5.6 |
| CdO | 15.4 | CdO | 1.2 |
| BaS | 20.6 | $TiO_2$ | 0.7 |
| NaI | 12.6 | S | 0.3 |
| $TiO_2$ | 9.6 | I | 0.8 |

Sufficient batch to provide about three pounds of glass was placed in a silica crucible and melted in a radiant heated furnace. The crucible was placed in the furnace at 1300°C. for 4 hours to melt the batch. The glass was then transferred to a platinum vessel and returned to the furnace with the latter still operating at 1300°C. A platinum stirring device was introduced into the melt and the glass stirred for one hour. The stirred glass was then cast into discs approximately 55 mm. in diameter.

The melting unit was electrically heated with no special atmosphere provisions. Thus, the melting and stirring atmosphere was ambient air.

The temperature-viscosity curve for the glass is shown in FIG. 1 and designated as B. For comparison, the corresponding curve for a standard optical crown glass, that is a $Na_2O$-$K_2O$-$CaO$-$SiO_2$ glass containing a few percent each of $Al_2O_3$ and ZnO, is also shown (Curve C). It will be observed that this glass has a viscosity of 200 poises at about 1375°C., a temperature much too high for present purposes.

EXAMPLE 4

A modification of the filter glass of Example 3 was formulated, the batch and the corresponding oxide composition, by weight as calculated from the batch, being:

| Batch | | Oxide | |
|---|---|---|---|
| Sand | 718 | $SiO_2$ | 53.0 |
| $H_3BO_3$ | 236 | $B_2O_3$ | 9.8 |
| Al(OH)$_3$ | 54.4 | $P_2O_5$ | 3.8 |
| Al(PO$_3$)$_3$ | 65.9 | $Al_2O_3$ | 3.6 |
| $BaCO_3$ | 20.5 | $Na_2O$ | 7.5 |
| $Na_2CO_3$ | 170.4 | $K_2O$ | 10.0 |
| $K_2CO_3$ | 199.2 | ZnO | 8.6 |
| ZnO | 116.7 | BaO | 2.5 |
| CdO | 15.4 | CdO | 1.2 |
| BaS | 20.6 | S | 0.3 |
| NaI | 12.6 | I | 0.8 |

Sufficient batch to provide three pounds of glass was placed in a platinum crucible and placed in a radiant heated furnace at 1300°C. for 4 hours to melt the batch. The melt was then stirred with a platinum stirrer for an hour while being maintained at 1300°C. Thereafter, the glass was cast into 55 mm. discs.

The discs cast from the melts of Examples 3 and 4 were annealed at 540°C. and then prepared for transmission measurements. At this point, one disc of each glass was subjected to a further heat treatment consisting of heating the glass at 620°C. for 45 minutes. This heat treatment was designed to "strike in" the glass color fully.

Transmission measurements were then made on the four samples over the visible range of the spectrum. For further illustration, a similar set of measurements was made on a glass sample from Example 1. The resulting transmission curves are shown in FIG. 2 wherein the wavelength of light is plotted along the horizontal axis and percent transmission through the glass at each wavelength is plotted on the vertical axis. The curves, and the samples measured, are identified as follows:

| | |
|---|---|
| Curve 1 | Example 1 — Annealed |
| Curve 3A | Example 3 — Annealed |
| Curve 3B | Example 3 — Annealed + Heat Treatment |
| Curve 4A | Example 4 — Annealed |
| Curve 4B | Example 4 — Annealed + Heat Treatment |

In producing cadmium sulfide glasses, it has been common practice to include a compound such as $CaF_2$ to provide nuclei for the colorant materials to precipitate and grow on. In the glasses of Examples 3 and 4, it is believed the phosphate functions in a different manner to facilitate crystallization. It appears to cause phase separation of the base glass. This in turn provides centers for the cadmium sulfide to precipitate on.

Alumina ($Al_2O_3$) in the glass has a counter action to the phosphate in that it promotes miscibility. However, alumina is highly desirable to improve durability. Therefore, the precipitation of cadmium sulfide is controlled by manipulating the $P_2O_5/Al_2O_3$ ratio in the glass.

The effect of adjusting the $P_2O_5/Al_2O_3$ ratio is shown by comparing Curves 3A and 4A in FIG. 2. The higher $P_2O_5/Al_2O_3$ ratio in the glass of Example 4 causes the glass to "strike in," that is attain essentially its final desired color on forming and annealing. This is illustrated by the sharp cutoff in transmission in the vicinity of 5000 A.; also, by the insignificant change in the shape of the curve of the reheated sample (4B). Glass 3, with the lower $P_2O_5/Al_2O_3$ ratio, does not "strike in" fully on forming, but requires a reheating treatment as shown by comparing Curves 3A and 3B. It is apparent then that, for any given glass composition and melting and forming conditions, an optimum $P_2O_5/Al_2O_3$ ratio can be selected for color formation.

EXAMPLES 5–8

The following compositions, set forth in weight percent on the oxide basis as calculated from the batch, further illustrate the invention. A melt of each glass was made and the index of refraction measured on a glass body cast from the melt. These index values are recorded, together with the compositions in the table below. These examples then illustrate the manner in which refractive index can be varied if a fixed index glass is required, as for ophthalmic purposes.

| | 5 | 6 | 7 | 8 |
|---|---|---|---|---|
| $SiO_2$ | 53.0 | 60.0 | 57.3 | 49.4 |
| $B_2O_3$ | 9.8 | 6.4 | 6.4 | 9.6 |
| $P_2O_5$ | 3.8 | 3.9 | 3.9 | 3.9 |
| $Al_2O_3$ | 3.8 | 3.8 | 3.7 | 3.8 |
| $Na_2O$ | 7.0 | 6.9 | 6.8 | 6.9 |
| $K_2O$ | 10.6 | 10.4 | 10.4 | 10.4 |
| BaO | 1.4 | 1.4 | 1.4 | 2.8 |
| ZnO | 9.2 | 6.0 | 8.9 | 12.0 |
| CdO | 1.2 | 1.2 | 1.2 | 1.2 |
| F | | | 0.5 | |
| $n_D$ | 1.51818 | 1.51464 | 1.51893 | 1.53805 |

For ophthalmic purposes, a glass having a standard refractive index of 1.523 is frequently required. A comparison of Examples 5–8 with Example 4 will readily indicate how the base glass composition can be adjusted to this index value. The index value of the glass of Example 4 is 1.527.

I claim:

1. A clear, yellow-to-red glass exhibiting a viscosity not exceeding about 200 poises at 1300°C., and demonstrating compatibility with platinum so that the two may be brought in contact with each other without destructive alloying of the latter when the glass is in the molten state under nonreducing conditions at a temperature not exceeding 1300°C., said glass having a composition consisting essentially, in weight percent on the oxide basis, of 40–60% $SiO_2$, 5–20% $B_2O_3$, 0–8% $P_2O_5$, 1.5–6.0% $Al_2O_3$, 4–8% $Na_2O$, 6–14% $K_2O$, 4–12% ZnO, 0–6% BaO, 0.2–2.0% CdO, and 0.2–1.0% S.

2. A glass in accordance with claim 1 wherein the composition further includes up to 1 percent selenium.

3. A glass in accordance with claim 1 wherein the composition includes at least 2 percent BaO.

* * * * *

UNITED STATES PATENT OFFICE
CERTIFICATE OF CORRECTION

Patent No. 3,773,530          Dated November 20, 1973

Inventor(s) David W. Morgan

It is certified that error appears in the above-identified patent and that said Letters Patent are hereby corrected as shown below:

Column 1, line 50, "eld" should be -- held --.

Column 8, line 37, Examples 5 and 6, "$P_2O_5$" should be -- 4.0 -- and -- 3.9 --, respectively.

Signed and sealed this 7th day of May 1974.

(SEAL)
Attest:

EDWARD M. FLETCHER, JR.          C. MARSHALL DANN
Attesting Officer          Commissioner of Patents